(No Model.)

W. R. JONES.
APPLIANCE FOR ROLLS.

No. 382,704.  Patented May 15, 1888.

WITNESSES.

INVENTOR.

William R. Jones,
by W. Bakewell & Sons.
his Attorneys.

UNITED STATES PATENT OFFICE.

WILLIAM R. JONES, OF BRADDOCK, PENNSYLVANIA.

APPLIANCE FOR ROLLS.

SPECIFICATION forming part of Letters Patent No. 382,704, dated May 15, 1888.

Application filed March 31, 1888. Serial No. 269,085. (No model.)

*To all whom it may concern:*

Be it known that I, WILLIAM R. JONES, of Braddock, in the county of Allegheny and State of Pennsylvania, have invented a new and useful Improvement in Appliances for Rolls; and I do hereby declare the following to be a full, clear, and exact description thereof, reference being had to the accompanying drawings, forming part of this specification, in which—

Figure 1:
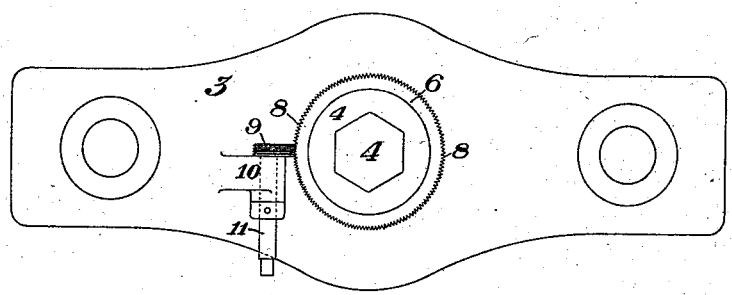
Figure 2:
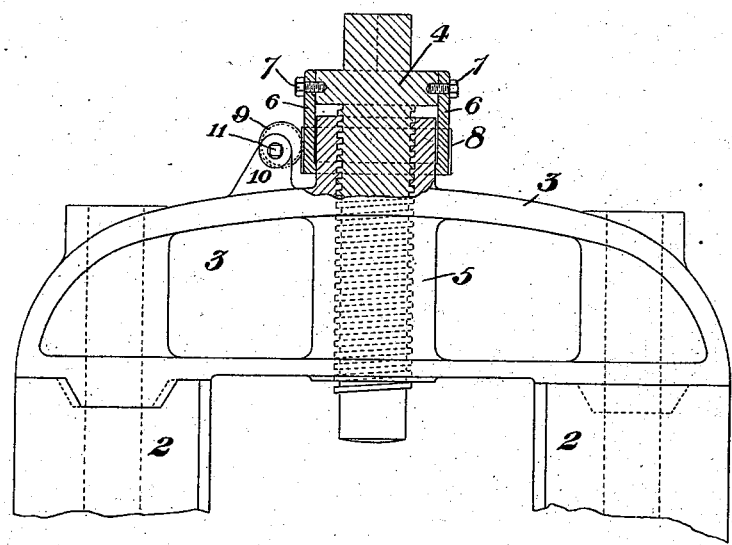
Figure 3:
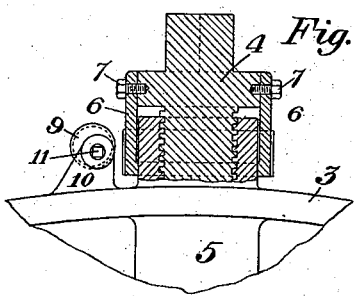

Figure 1 is a plan view of the housing-cap at one end of a set of rolls, showing my improved lock applied thereto. Fig. 2 is a side view of the housing, showing the upper part of the adjusting-screw of the rolls in vertical section. Fig. 3 is a view similar to Fig. 2, showing the lock disengaged from the adjusting-screw.

Like symbols of reference indicate like parts in each.

In the operation of rolls for rolling metal there has always been difficulty in preventing the work of the rolls from jarring loose the adjusting screws by which the bearings of the rolls are held in their proper positions. A slight change in the adjustment of the bearings is a very serious matter, because it immediately affects the operation of the rolls and causes a lack of uniformity in the product of the mill. Heretofore various devices have been employed for the purpose of locking the adjusting-screws of the rolls; but they have been hard to adjust, and have not been sufficiently accurate and secure to make their use entirely unobjectionable.

The object of my invention is to obviate the objections which I have indicated, and to provide a lock which can be operated easily and without loss of time, and which in its action permits the adjustment of the rolls with a great degree of accuracy.

Referring now to the drawings, 2 represents the housings, at one end of a set of rolls.

3 is the housing-cap, and 4 is the adjusting-screw, which works in a threaded socket, 5, in the housing-cap, and at its lower end bears on the bearings of the upper roll.

The rolls are adjusted by interposing separators or liners between their bearings, and then by screwing down the adjusting-screws against the bearings of the upper roll the rolls are held in place and their adjustment is preserved. The difficulty is that in the operation of the rolls the jarring is apt to affect the adjusting-screws, so as to loosen their hold on the bearings of the rolls, and it is this which it is the purpose of my invention to prevent. To do this, I provide the shank of the screw 4, near its upper end, with a collar, 6, which is fixed to the screw by set-screws 7, or otherwise, and thus forms part of the shank of the screw, and around the circumference of this collar I form a number of parallel serrations or grooves, 8. A disk, 9, is mounted eccentrically on a short shaft, 11, which is journaled in a bearing, 10, on the housing-cap, so that the disk can be moved into contact with the toothed collar 6, as shown in Figs. 1 and 2, or out of contact with it, as shown in Fig. 3. The periphery of this disk 9 is serrated correspondingly to the serrations of the collar 6, and when the disk and collar are in contact the serrations engage each other, thus locking the collar and the screw 4, which is attached thereto. This affords very accurate and secure means of adjusting the screw. When the bearings of the rolls have been properly adjusted and the screw 4 screwed down into its proper position, the lock 9, by means of a wrench fitted on the squared end of the shaft 11 of the disk, is turned into contact with the toothed collar, and by engaging the collar holds the screw in position and prevents it from being disturbed by operation of the rolls, as will be readily understood.

When it is desired to change the adjustment of the rolls, or for any other reason to shift the screw 4, the lock 9 is thrown back on its pivot into the position shown in Fig. 3, and this leaves the adjusting-screw free to be turned.

The advantages of my improvement will be appreciated by those skilled in the art. It is very accurate, secure, and requires, practically, no time and labor for its adjustment.

I claim—

1. An improvement in appliances for rolls, which consists in the combination, with the adjusting-screw, which is provided with serrations or teeth, of a pivoted lock which is movable on its pivot to engage the said serrations or teeth, substantially as and for the purposes described.

2. An improvement in appliances for rolls, which consists in the combination, with the adjusting-screw, which is provided with serrations or teeth, of a pivoted lock which is movable on its pivot to engage the said serrations or teeth, said lock being also serrated, substantially as and for the purposes described.

In testimony whereof I have hereunto set my hand this 27th day of March, A. D. 1888.

WILLIAM R. JONES.

Witnesses:
   THOMAS W. BAKEWELL,
   W. B. CORWIN.